United States Patent
Eason et al.

[11] Patent Number: 6,105,293
[45] Date of Patent: Aug. 22, 2000

[54] DISPLAY DEVICE

[75] Inventors: Andrew Eason, Somerville; Stuart Eason, East Hawthorn; Julian Cowan, Elwood; Anthony Tesselaar, Silvan, all of Australia

[73] Assignee: Norwood Industries PTY LTD, Knoxfield, Australia

[21] Appl. No.: 09/066,562

[22] Filed: Apr. 27, 1998

[30] Foreign Application Priority Data

Apr. 30, 1997 [AU] Australia ................................. PO6506

[51] Int. Cl.⁷ ............................... G09F 23/00; G09F 3/20
[52] U.S. Cl. ................................ 40/645; 40/651; 40/649; 40/607; 40/666; 40/658
[58] Field of Search ............................. 40/645, 324, 651, 40/649, 607, 666, 658

[56] References Cited

U.S. PATENT DOCUMENTS

| | | | |
|---|---|---|---|
| 1,674,005 | 6/1928 | Eschenbach | 40/645 |
| 1,983,815 | 12/1934 | Schmiett | 40/645 X |
| 2,835,994 | 5/1958 | Kuefner | 40/645 |
| 2,987,841 | 6/1961 | Phillips | 40/658 |
| 3,057,093 | 10/1962 | Gallo | 40/645 |
| 3,325,929 | 6/1967 | Mauchline | 40/658 |
| 4,027,410 | 6/1977 | Wheeler | 40/645 |
| 4,173,086 | 11/1979 | Hempfling | 40/645 X |
| 5,044,200 | 9/1991 | Dailey et al. | 40/645 X |
| 5,537,768 | 7/1996 | Tesselaar et al. | |

FOREIGN PATENT DOCUMENTS

B-52911/90  10/1990  Australia .

*Primary Examiner*—Terry Lee Melius
*Assistant Examiner*—Rodrigo J. Morales
*Attorney, Agent, or Firm*—Oliff & Berridge, PLC

[57] ABSTRACT

A display device for displaying a display object includes a mounting formation for holding the display device in place, an attachment formation for attaching a display object to the display device, and a connecting member linking the mounting formation and the attachment formation. The mounting formation is configured such that it is capable of locking securely to a container or base structures. The connecting member holds the attachment formation at a position remote from the mounting formation. The attachment formation includes a control zone, and the control zone includes an entrance into which an attachment member on the display object may be inserted. The control zone further includes at least one stop formation projecting traversely across the control zone such that a part of the display object attachment member may abut against the stop formation to inhibit withdrawal of the display object attachment member through the control zone entrance.

8 Claims, 2 Drawing Sheets

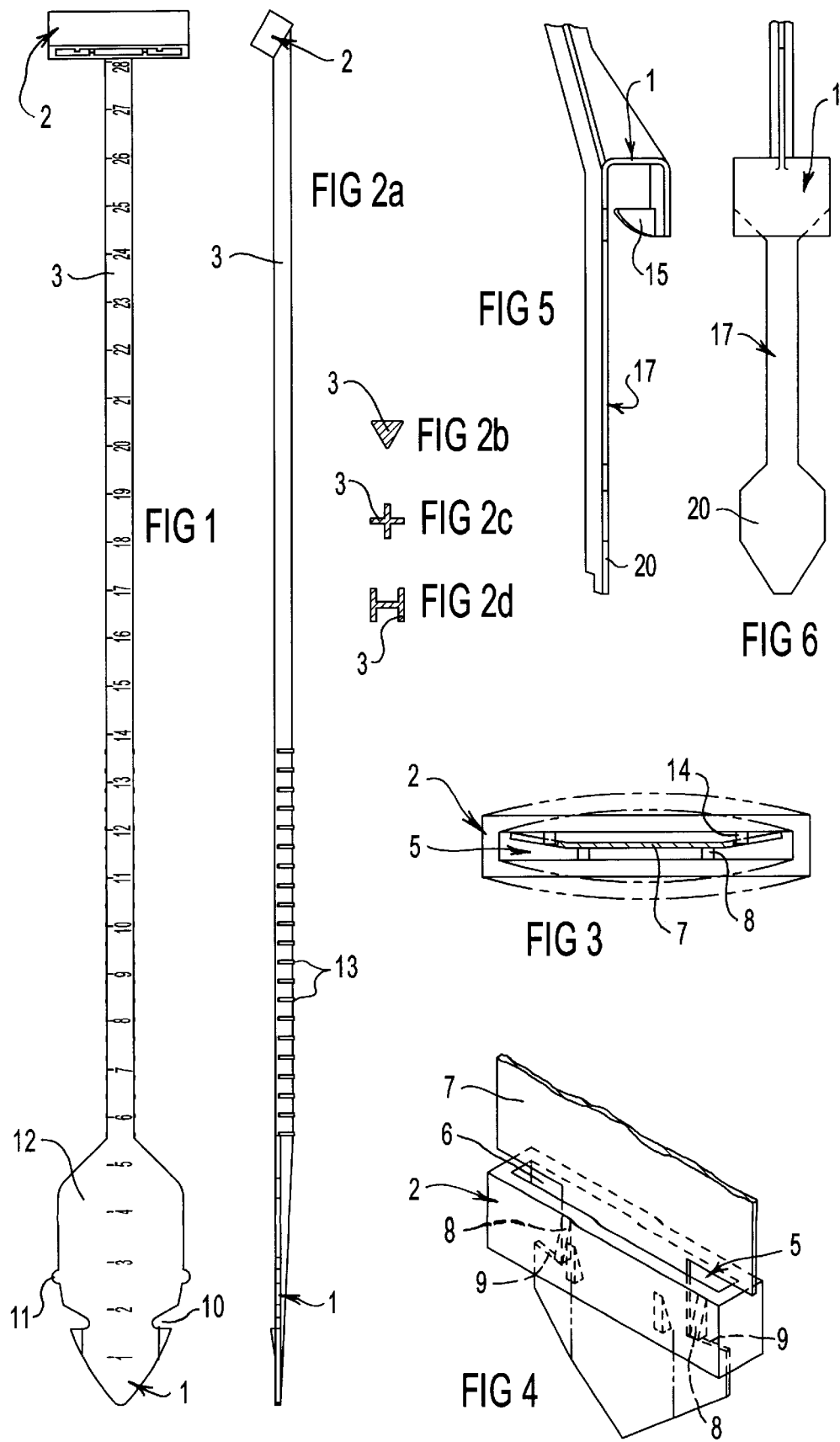

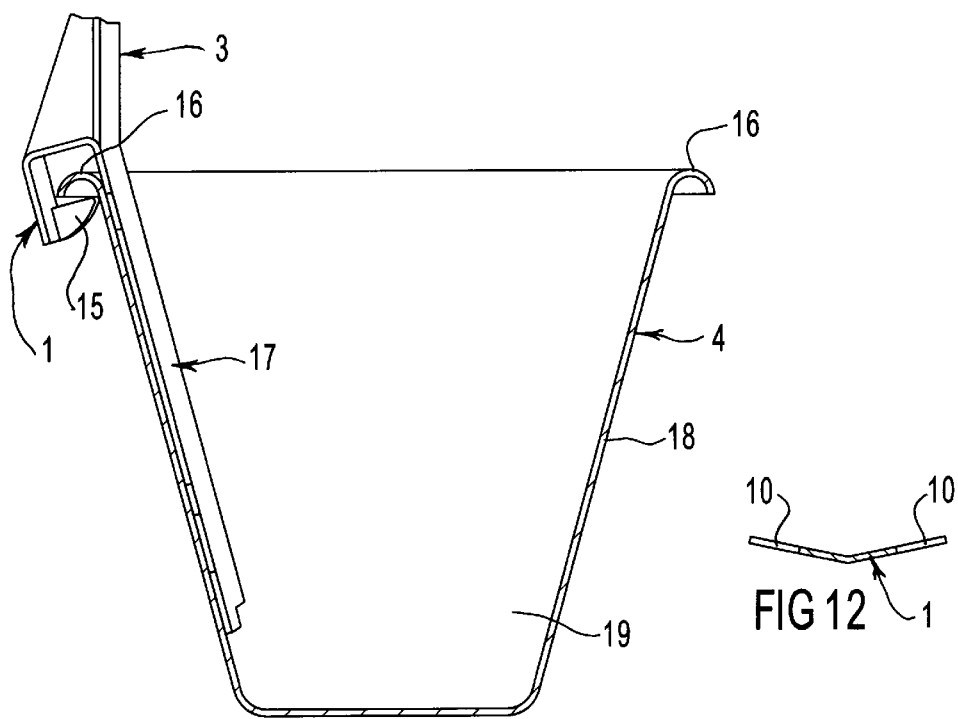
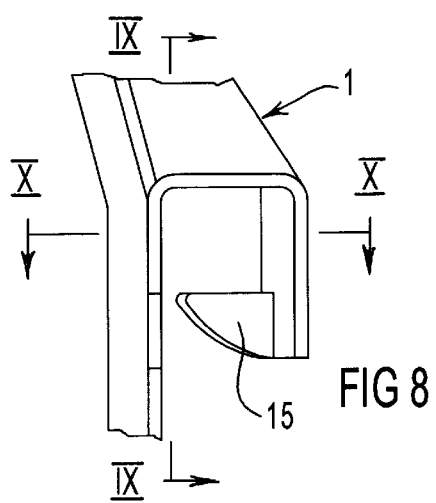
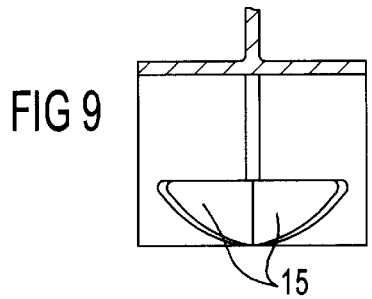
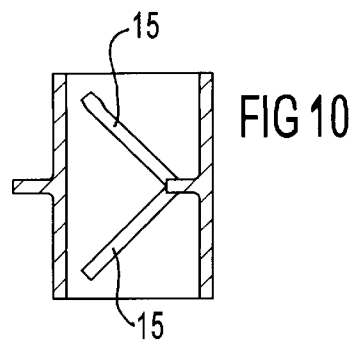
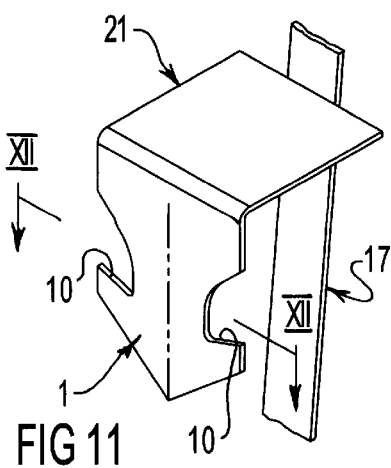

DISPLAY DEVICE

This invention relates to a display device for displaying a display object. It relates particularly but not exclusively to a display device suitable for use in conjunction with plant containers for displaying objects such as plant labels, product information, and seed and fertiliser packets. The following discussion relates mainly to plant-type applications, but it is to be understood that the invention is equally applicable to other display applications including retail point of sale displays.

Plant pots, trays and punnets bearing seedlings and small plants are produced in large volumes by wholesale nurseries. Each pot, tray or punnet needs to be marked with a label indicating the type of plant growing in the container and often providing additional information relating to the plant. Labels can be applied by pushing them into the soil, although there is a significant risk that such labels will blow away. Labels can also be applied by tying them around the plant in the plant pot: however, this technique is relatively labour intensive and can only be applied if the plant is sufficiently large to take a label without being damaged.

Australian Patent 616346 describes a label mounting device which can be formed into plant containers, allowing labels to be fixed to the containers. This arrangement is quite effective, and requires no more effort in affixing labels than is required for inserting labels into the soil. However, it has been found, especially with larger plants, that the level of the top of the container is not always the most suitable place for positioning a label. It is often desirable that a label be located at a higher position. It is also often desirable that a label be positioned in such a way as to maximise the prospects of attracting the attention of a prospective customer.

U.S. Pat. No. 5,537,768 describes a label display stake for use with plant containers. The label display stake has an upper label carrying portion and a lower mounting portion which is located within a pit container when the stake is in use. The label display stake successfully displays a label at a height designed to attract a customer's attention, and some of the embodiments described in U.S. Pat. No. 5,537,768 effectively retain labels on their upper label carrying portion; however, such labels are not necessarily secured in such a way as to ensure that the contents of the label are displayed to prospective customers In a most advantageous manner.

According to one aspect of the present invention, there is provided a display device for displaying a display object, including a mounting formation for holding the display device in place, an attachment formation for attaching a display object to the display device, and a connecting member linking the mounting formation and the attachment formation, wherein:
(a) the mounting formation is configured such that it is capable of locking securely to a container or base structure;
(b) the connecting member holds the attachment formation at a position remote from the mounting formation;
(c) the attachment formation includes a control zone;
(d) the control zone includes an entrance into which an attachment member on a display object may be inserted; and
(e) the control zone further includes at least one stop formation projecting transversely across the control zone such that a part of a display object attachment member may abut against the stop formation to inhibit withdrawal of the display object attachment member through the control zone entrance.

According to another aspect of the invention, there is provided a multi-purpose plant stake including a head at one end and a display object attachment formation at the other end, wherein:
(a) the head is configured such that it is capable of locking securely to a plant container or base structure;
(b) the attachment formation includes a control zone;
(c) the control zone includes an entrance into which an attachment member on a display object may be inserted; and
(d) the control zone further includes at least one stop formation projecting transversely across the control zone such that a part of a display object attachment member may abut against the stop formation to inhibit withdrawal of the display object attachment member through the control zone entrance.

The mounting formation or head may be of any suitable configuration. In one suitable configuration, it may comprise a substantially arrow head shape suitable for locking into a label mounting device of the type described in Australian Patent 616346. Such a label mounting device gives the display device or plant stake a fair degree of resistance to lateral movements. If a greater degree of resistance is required, the display device or plant stake may include a further member projecting downwardly from a position near the mounting formation or head in such a way that in use the additional member will locate against the outside of the plant container or, more preferably, against the inside of the container, preferably being covered with soil or other plant growth medium to enhance stability.

Another suitable configuration for the mounting formation or head comprises a resilient attachment clip for mounting over the rim or lip of a container. The clip may have any suitable configuration and may be formed integrally with the display device or plant stake, or alternatively it may be attached to the display device or plant stake. As for the embodiment described above wherein the mounting formation or head comprises an arrow head shape, there may be an additional member projecting downwardly from a position at or near the mounting formation or head, designed to abut against the outside or inside of a container in use, thereby adding stability to the display device or stake.

The connecting member or the body of the stake may be of any suitable shape and configuration. In most embodiments, it is narrow, substantially straight and elongate in configuration. However, none of these qualities is essential.

It is preferred that the connecting member or stake body be sufficiently rigid to avoid excessive bending when a display object is attached to the attachment formation. In one suitable configuration, the connecting member or stake body is substantially triangular in cross-section. In another suitable configuration, the connecting member or stake body is substantially H shaped in cross-section. In another suitable embodiment, the connecting member or stake body is substantially X shaped in cross-section.

The control zone may be of any suitable shape and configuration. In one preferred configuration, the control zone includes two substantially parallel walls, and the stop formation projects from one wall towards the other.

The control zone entrance may be located at any suitable orientation relative to the rest of the display device or plant stake. In one suitable configuration, the entrance to the control zone faces away from the mounting formation or plant stake head, so that a display object is attached to the attachment formation by moving the display object attachment member into the control zone in a direction towards the mounting formation or head. In another suitable configuration, the control zone entrance faces towards the mounting formation or head, so that a display object is attached to the attachment formation by moving the display object attachment member into the control zone entrance in a direction away from the mounting formation or head. In these two alternative arrangements, when the display device or plant stake is mounted on a container or base structure in an upright configuration with the attachment formation at the top, the display object may project upwardly or alternatively downwardly from the attachment formation.

As an optional feature, the display device or plant stake may include a flattened region in the mounting formation or head in order to make the display device or plant stake easier to insert into soil or a similar substance when the display device or plant stake is used for a purpose other than attachment to a container or base structure.

As a further optional feature, measurement gradations may be marked along the connecting member or stake body to enable the display device or plant stake to be used as an aid to measurement.

As a further optional feature, lateral ribbing may be provided on the connecting member or plant stake body near the mounting formation or head in order to give an operator a firm grip when inserting the display device or plant stake into a container, base structure, soil or other medium.

The invention will hereinafter be described in greater detail by reference to the attached drawings which show example forms of the invention. It is to be understood that the particularity of those drawings does not supersede the generality of the preceding description of the invention.

FIG. 1 is a front view of a display device according to an embodiment of the invention.

FIG. 2a is a side view of the embodiment of FIG. 1.

FIGS. 2b, 2c and 2d show examples of alternative cross-sectional shapes for the connecting member of the display device of FIG. 1.

FIG. 3 is a top view of the attachment formation of the display device of FIG. 1, showing a display object attachment member in the act of being inserted.

FIG. 4 is a perspective view of the attachment formation of the display device of FIG. 1, showing a display object attachment member fully inserted into the attachment formation.

FIG. 5 shows a side view of an alternative lower part for the display device of FIG. 1.

FIG. 6 shows a front view of the lower part shown in FIG. 5.

FIG. 7 shows the lower part illustrated in FIG. 5 mounted on a container.

FIG. 8 is an enlarged view of the mounting formation of the embodiment shown in FIG. 5.

FIG. 9 is a cross-sectional view of the mounting device of FIG. 8, taken along the line IX—IX.

FIG. 10 is a cross-sectional view of the mounting formation of FIG. 8, taken along the line X—X.

FIG. 11 is a perspective view of a further embodiment of a mounting formation.

FIG. 12 is a cross-sectional view taken along the line XII—XII in FIG. 11.

The invention comprises a display device for displaying a display object, including a mounting formation 1 for holding the display device in place, an attachment formation 2 for attaching the display object to the display device, and a connecting member 3 linking the mounting formation and the attachment formation.

Mounting formation 1 is configured such that it is capable of locking securely to a container or base structure (shown as 4 in FIG. 7, but not shown in the other drawings). Connecting member 3 holds attachment formation 2 at a position remote from mounting formation 1. This enables the display device to display a display object at a position designed to maximise the impact to a customer.

Attachment formation 2 includes a control zone 5 defined within an unbroken control zone perimeter. Control zone 5 includes entrance 6 into which an attachment member 7 on a display object may be inserted. Control zone 5 further includes at least one stop formation 8 projecting transversely across control zone 5 such that a part or edge 9 of display object attachment member 7 may abut against stop formation 8 to inhibit withdrawal of display object attachment member 7 through control zone entrance 6. In one particular application, the display device may comprise a multi-purpose plant stake. In such an application, mounting formation 1 may be in the form of a head at one end of the plant stake.

One suitable configuration for the mounting formation or head is shown in FIG. 1. This configuration includes shoulders 10 which are suitable for locating behind stop formations in a mounting device attached to a container or base structure. In a particularly preferred embodiment, the mounting device on the container or base structure has a configuration identical or similar to that of the attachment formation on the display device, as shown in FIGS. 3 and 4. As a preferred feature, the head or mounting formation shown in FIG. 1 includes protrusions 11 which limit the depth of insertion of the head into a mounting device.

Head 1 as shown in FIG. 1 further includes a flattened portion 12 which is designed to provide resistance to rotational movement when the display device or plant stake is inserted into soil or another loose medium, rather than being inserted into a mounting device.

Connecting member 3 may be of any suitable shape and configuration. Three alternative suitable cross-sectional shapes are shown in FIGS. 2b, 2c and 2d. When the display device is employed as a multi-purpose plant stake, connecting member 3 comprises the body of the plant stake.

Connecting member 3 as shown in the drawings is relatively long and narrow, although this shape is not a necessary feature. Connecting member 3 may be as wide as desired, and it need not necessarily be straight.

In the embodiment illustrated in FIG. 1, connecting member 3 includes graduated measurement markings, enabling use of the display device or multi-purpose plant stake as a ruler or measurement device for such purposes as measuring separation between plants during planting, measuring the height of plants, measuring the size of containers, measuring the depth of insertion in soil, and many other such applications.

As illustrated in FIG. 2a, the preferred embodiment includes ribbing 13 on connecting member 3, and this can assist a person in obtaining a firm grip on the display device or multi-purpose plant stake when inserting it into soil or a similar medium.

Referring now particularly to FIGS. 3 and 4, the embodiment of attachment formation shown includes two stop formations 8 which project transversely across the control zone. The arrangement illustrated includes two further projections 14 which project in an opposite direction across the control zone. These serve to keep the display object attachment member in place behind stop formations 8 once attachment member 7 has been fully inserted into control zone 5, thereby inhibiting withdrawal. As a preferred feature, stop formations 8 and projections 14 are ramped from control zone entrance 6, making it relatively easy to insert attachment member 7, but relatively difficult to withdraw attachment member 7 after it has been fully inserted.

In the embodiment illustrated, stop members 8 abut against edges 9 of display object attachment member 7. However, edges 9 need not be external edges of attachment member 7, and control zone 5 is capable of functioning equally well if edge 9 is an internal edge of attachment member 7, such as the edge of a hole in attachment member 7 or one side of a slit in attachment member 7.

As shown in FIG. 4, control zone entrance 6 is at the top of attachment formation 2, so that display object attachment member 7 is inserted in a downwards direction. However, control zone entrance 6 may equally be the underside of attachment formation 2, as illustrated in FIG. 1. In this arrangement, display object attachment member 7 is inserted upwardly into the control zone.

The display object connected to attachment member 7 may be any suitable display object. Labels such as plant labels, price tags and product information labels are suitable display objects. Other suitable display objects include sample sachets, plant seed or fertiliser packets, and other small packages and packets.

Referring now to the embodiment illustrated in FIGS. 5 to 10, only the bottom section of the display device is depicted in each case; the top section remains as shown in FIGS. 1 and 2a.

FIG. 5 shows a different embodiment of the mounting formation 1 including resilient clips 15 which are designed to clip under the lip or rim 16 of a plant container 4. The embodiment includes a further downwardly projecting member 17 which adds stability to the display device by resting against wall 18 of container 4 when in use. Stability is further enhanced if container 4 is filled with soil or a similar substance 19. Downwardly projecting member 17 may include broadened section 20 which gives resistance against rotational movement when the display device or plant stake is placed directly in soil or a similar medium, rather than mounted on a container. Further details of clips 15 are shown in FIGS. 8, 9 and 10.

A further arrangement for mounting formation 1 is shown in FIGS. 1 and 12. In this arrangement, mounting formation 1 is designed for cooperation with a mounting device on a container or base structure, with the mounting device being similar to the attachment formation shown in FIGS. 3 and 4. In this respect, the embodiment of FIG. 11 is close to the embodiment of FIG. 1. However, this embodiment also includes downwards projection 17, which adds to stability when the display device is mounted in a container. In this embodiment, mounting formation 1 is offset from the rest of the display device, which is otherwise relatively straight.

The display device of the present invention may be made from any suitable material or combinations of materials. One particularly suitable type of material is moulded plastics.

It is to be understood that various alterations, additions and/or modifications may be made to the parts previously described without departing from the ambit of the invention.

What is claimed is:

1. A display device for displaying a display object, including a mounting formation for holding the display device in place, an attachment formation for attaching a display object to the display device, and a connecting member linking the mounting formation and the attachment formation, wherein:

(a) the mounting formation is configured such that it is capable of locking securely to a container or base structure;
   (b) the connecting member holds the attachment formation at a position remote from the mounting formation;
   (c) the attachment formation includes a control zone defined within an unbroken control zone perimeter formed by one or more walls;
   (d) the control zone includes an entrance into which an attachment member on a display object may be inserted; and
   (e) the control zone further includes at least one stop formation projecting transversely across the control zone such that an edge of a display object attachment member may abut against the stop formation, locking the display object into place and inhibiting withdrawal of the display object attachment member through the control zone entrance.

2. A display device according to claim 1 wherein the control zone includes two substantially parallel walls and the stop formation projects from one wall towards the other.

3. A display device according to claim 1 wherein the mounting formation includes one or more edges which, when the display device is mounted on a container or base structure, abut against one or more parts of the container or base structure to inhibit removal of the display device from the container or base structure.

4. A display device according to claim 3 wherein the mounting formation is substantially rigid.

5. A display device according to claim 3 wherein the mounting formation flexes as the display device is mounted onto the container or base structure.

6. A multi-purpose plant stake including a head at one end and a display object attachment formation at the other end, wherein:

(a) the head is configured such that it is capable of locking securely to a plant container or base structure;
   (b) the attachment formation includes a control zone defined within an unbroken control zone perimeter formed by one or more walls;
   (c) the control zone includes an entrance into which an attachment member on a display object may be inserted; and
   (d) the control zone further includes at least one stop formation projecting transversely across the control zone such that an edge of a display object attachment member may abut against the stop formation, locking the display object into place and inhibiting withdrawal of the display object attachment member through the control zone entrance.

7. A multi-purpose plant stake according to claim 6 wherein the control zone includes two substantially parallel walls and the stop formation projects from one wall towards the other.

8. A multi-purpose plant stake according to claim 6 wherein the head has a flattened substantially rigid configuration to assist in insertion into soil.

* * * * *